Patented June 25, 1935

2,006,017

UNITED STATES PATENT OFFICE 2,006,017

4-AMINO-1.8-NAPHTHALENE-DICARBOX-YLIC ACID IMIDES AND 4-ALKYLAMINO-1,8-NAPHTHALENE-DICARBOXYLIC ACID ALKYLIMIDES AND A PROCESS OF PREPARING THEM

Wilhelm Eckert and Walter Gmelin, Frankfort-on-the-Main-Höchst, Germany, assignors to General Aniline Works, Inc., New York, N. Y., a corporation of Delaware No Drawing. Application March 24, 1933, Serial No. 662,638. In Germany March 24, 1932

8 Claims. (Cl. 260—124)

The present invention relates to 4-amino-1,8-naphthalene-dicarboxylic acid imides and 4-alkylamino-1,8-naphthalene-dicarboxylic acid alkylimides and a process of preparing them.

We have found that 4-amino-1,8-naphthalene-dicarboxylic acid imides (4-aminonaphthalimides) and 4-alkylamino-1,8-naphthalene-dicarboxylic acid alkylimides are obtainable with a very good yield and in a very pure state by heating 4-sulfo-1,8-naphthalene-dicarboxylic acid (obtainable, for instance, by sulfonation of acenaphthene in an organic solvent and subsequent oxidation) or the anhydride or the salts thereof with cyclohexylamine, alkylamine, hydrazine, ammonia or an agent yielding ammonia, i. e. with a compound of the formula:

wherein R stands for hydrogen or an alkyl-, cyclohexyl- or amino- group. The reaction is preferably carried out at temperatures of about 150° C. to about 180° C. If one uses ammonia, the reaction takes the following course:

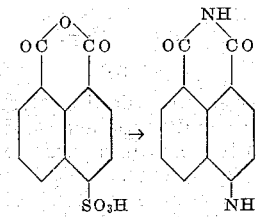

The formation of 4-aminonaphthalimides and 4-alkylaminonaphthalalkylimides, especially the easy exchange of the sulfo group for the amino-, hydrazino-, cyclohexylamino- or alkylamino-group, respectively, is surprising and could not be foreseen since, for instance, it has not been possible, hitherto, to transform α-/or β-naphthalene sulfonic acids by treatment with ammonia into the corresponding naphthylamines.

According to the present invention new compounds are obtainable, for instance, those of the following constitution:

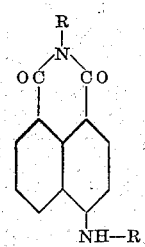

wherein R represents an amino-, alkyl- or cyclohexyl- group.

The 4-aminonaphthalimides and 4-alkylamino-naphthalalkylimides are valuable intermediate products for the manufacture of dyestuffs. Some of them are dyestuffs. The anhydrides and the salts of 4-sulfonaphthalene-1,8-dicarboxylic acid, in the light of the present invention, are equivalents of the acids. Though they are not specifically mentioned in the appended claims, they are to be considered as comprised by the present invention; the same applies to the substances yielding ammonia which are to be considered as equivalents of ammonia.

The following examples serve to illustrate the invention, but they are not intended to limit it thereto, the parts being by weight:

(1) 278 parts of 4-sulfo-1,8-naphthalene-dicarboxylic acid, 900 parts of aqueous ammonia of 24% strength and 900 parts of water are heated in an autoclave at about 170° C. to about 180° C. for about 5 hours. The aminonaphthalimide which has been formed, is filtered with suction, washed and dried. The yield is nearly quantitative. The product crystallizes in the form of yellow needles which even do not melt at 325° C. It dissolves difficultly in concentrated hydrochloric acid. In concentrated sulfuric acid it dissolves to a yellow solution and in fuming sulfuric acid of 20% strength to a yellow solution which, owing to sulfonation, shows an intense green fluorescence.

(2) By using in Example 1 instead of the aqueous ammonia 300 parts of ammonium sulfite, the aminonaphthalimide is obtained with a very good yield.

(3) By heating 1 part of 4-sulfo-1,8-naphthalene-dicarboxylic acid with 8 parts of aqueous methylamine of 20% strength for about 5 hours in an autoclave at about 150° C. to about 160° C., there is obtained in the form of yellow prisms the methylaminonaphthalmethylimide of the following formula:

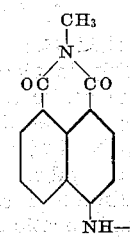

It melts at 256° C. to 258° C. With concentrated hydrochloric acid it forms a difficulty soluble salt which, on dilution with water, is redecomposed into the free base. In acetic ester it dissolves to a yellow solution having a green fluorescence.

(4) 100 parts of 4-sulfo-1,8-naphthalene-dicarboxylic acid, 125 parts of undecylamine, 10 parts of sodium sulfite and 3000 parts of water are heated in an autoclave for about 5 hours at about 170° C. to about 180° C. After removal of the water, the product is dissolved in about 1000 parts of hot glacial acetic acid and filtered. On cooling, the undecylaminonaphthalundecylimide of the following formula:

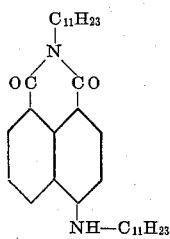
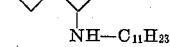

crystallizes in the form of a yellow magna. It is filtered with suction, washed with a small quantity of methyl alcohol and dried in vacuo. The yield of the pure product amounts to about 66% of that of the theory. By addition of water to the filtrate and filtration with suction further quantities of the product may be obtained.

The undecylaminonaphthalundecylimide is a yellow powder which is more or less easily soluble in all organic solvents to a yellow solution. It dissolves in cold benzine. The solution in benzine, when very diluted, shows a strong green fluorescence. Its melting point is 84° C.–86° C.

Instead of the alkylamines mentioned in Examples 3 and 4 there may also be used other amines as, for instance, ethyl-, propyl- or butylamines.

(5) By heating in an autoclave 50 parts of 4-sulfo-1,8-naphthalenedicarboxylic acid, 50 parts of hydroxyamino ethane and 5 parts of sodium sulfite in 300 parts of water for about 5 hours at about 170° C., there is obtained the brownish-yellow 4-hydroxyethylamino-1,8-naphthalic acid hydroxyethylimide of the formula:

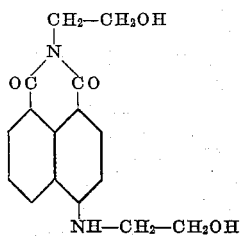
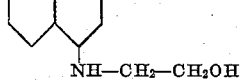

The product melts at 214° C.

It dissolves difficultly in alcohol, acetic ester, more easily in glacial acetic acid by yielding a yellow solution having a green fluorescence as the product obtainable according to Example 3. It easily dissolves in dilute and concentrated mineral acids to a yellow solution and it is also soluble in concentrated and dilute acetic acid.

(6) By heating as described in Example 3, 4-sulfo-1,8-naphthalenedicarboxylic acid with hydrazine-hydrate, there is obtained the brown hydrazidonaphthalhydrazide of the formula:

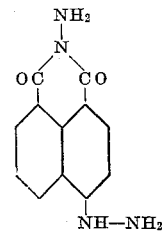

The product does not melt below 300° C. It dissolves very difficultly in organic solvents such as alcohol, glacial acetic acid and acetic ester. It dissolves in warm dilute mineral acids and crystallizes in the form of a salt. In concentrated sulfuric acid it dissolves to a yellow solution showing no fluorescence. In concentrated hydrochloric acid it forms an insoluble white salt.

(7) By using in Example 3 instead of methylamine a 65% solution of cyclohexylamine, there is obtained the light-yellow cyclohexylaminonaphthalcyclohexylimide of the formula:

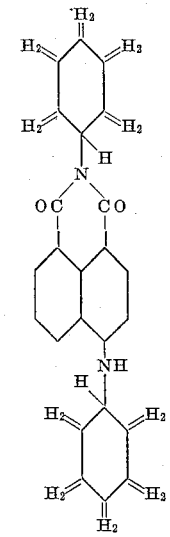

It easily dissolves in organic solvents such as ether, alcohol, glacial acetic acid and acetic ester to a yellow solution having a green fluorescence. It also dissolves in concentrated sulfuric acid. In dilute mineral acids it is insoluble.

(8) By using in Example 4 instead of undecylamine a higher aliphatic amine as, for instance, heptadecylamine, there is obtained the light-yellow heptadecylaminonaphthalheptadecylimide of the following formula:

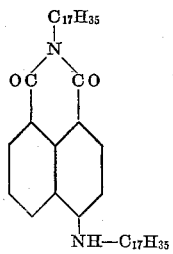

It has properties similar to those of the undecylaminonaphthalundecylimide.

(9) Instead of unsubstituted alkylamines there may be used substituted alkylamines. There is thus obtained by heating at 170° C. in an autoclave, for instance, 4-sulfo-1,8-naphthalenedicarboxylic acid and a 14% taurine solution in the presence of a small quantity of sodium sulfite, the water-soluble sulfoethylaminonaphthalsulfoethylimide of the following formula:

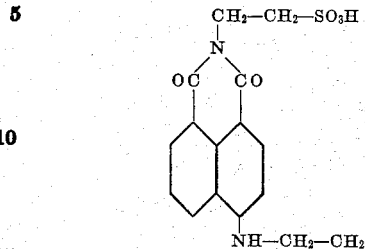

The product dyes the animal fiber greenish-yellow tints.

We claim:

1. The process which comprises heating naphthalene-4-sulfonic-1,8-dicarboxylic acid with a compound of the formula:

NH₂R wherein R stands for hydrogen or an alkyl-, cyclohexyl- or NH₂-group.

2. The process which comprises heating in a pressure vessel at a temperature of about 170° C. to about 180° C. for about 5 hours naphthalene-4-sulfonic-1,8-dicarboxylic acid with aqueous ammonia.

3. The process which comprises heating in a pressure vessel at a temperature of about 170° C. for about 5 hours naphthalene-4-sulfonic-1,8-dicarboxylic acid with hydroxyamino-ethane in the presence of water and sodium sulfite.

4. The process which comprises heating in a pressure vessel at a temperature of about 170° C. to about 180° C. for about 5 hours naphthalene-4-sulfonic-1,8-dicarboxylic acid with undecylamine in the presence of water and sodium sulfite.

5. The compounds of the following constitution:

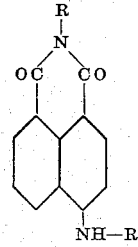

wherein R represents an amino-, alkyl or cyclohexyl group.

6. The compound of the following constitution:

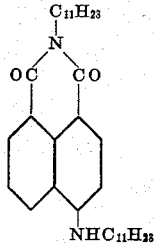

forming a yellow powder which is more or less easily soluble in all organic solvents to a yellow solution and dissolving in cold benzine to a yellow solution which, when very diluted, shows a strong green fluorescence.

7. The compound of the following formula:

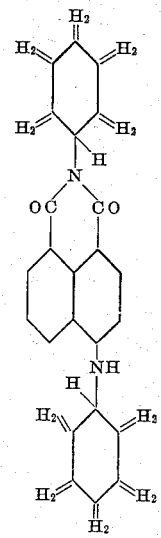

dissolving easily in organic solvents such as ether, alcohol, glacial acetic acid and acetic ester to a yellow solution having a green fluorescence, dissolving in concentrated sulfuric acid and being insoluble in dilute mineral acids.

8. The compound of the following formula:

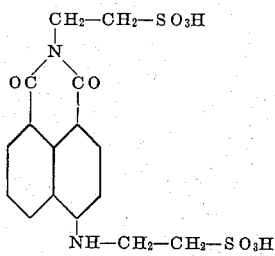

dyeing the animal fiber greenish-yellow tints.

WILHELM ECKERT.
WALTER GMELIN.